United States Patent [19]

Jewell

[11] Patent Number: 4,701,030
[45] Date of Patent: Oct. 20, 1987

[54] THERMAL STABLE OPTICAL LOGIC ELEMENT

[75] Inventor: Jack L. Jewell, Bridgewater, N.J.

[73] Assignee: American Telephone and Telegraph Company, AT&T Bell Laboratories, Murray Hill, N.J.

[21] Appl. No.: 712,212

[22] Filed: Mar. 15, 1985

[51] Int. Cl.$^4$ .................. G02F 1/01; G02F 1/015; G02F 1/17

[52] U.S. Cl. .................................................. 350/354

[58] Field of Search ................ 350/354, 393; 364/713

[56] References Cited

U.S. PATENT DOCUMENTS 3,617,779 11/1971 Rosenberg ........................... 350/354
4,507,776 3/1985 Smith .................................. 350/354

OTHER PUBLICATIONS

Marburger et al, "Theory of a Lossless Nonlinear Fabry-Perot Interferometer", Physical Rev. A, 1-1978, pp. 335-342.
Gunn, J. B., "Light Modulator & Optical Logical Devices", IBM Tech. Disc. Bull., 5-1965, pp. 1202-1205.
Smith, P. W., "On the Physical Limits of Digital Optical Switching & Logic Elements", Bell System Tech. Jr., 10-1982, pp. 1975-1993.
Applied Physics Letters, 42, Jan. 15, 1983, pp. 131-133.
Applied Physics Letters, 45, 1984, pp. 13-15.
Applied Physics Letters, 44, Jan. 15, 1984, pp. 172-174.
Applied Physics Letters, 34, Apr. 15, 1979, pp. 511-514.
Applied Optics, Dec. 1969, pp. 2549-2552.

Primary Examiner—William H. Punter
Attorney, Agent, or Firm—Richard D. Laumann; Peter A. Businger

[57] ABSTRACT

An optical logic element in which energy absorption is approximately constant is described.

10 Claims, 3 Drawing Figures

THERMAL STABLE OPTICAL LOGIC ELEMENT

TECHNICAL FIELD

This invention relates generally to the field of optical logic elements and particularly to such optical logic elements which are operated in a thermally stable mode.

BACKGROUND OF THE INVENTION

There is a great deal of interest at the present time in optical logic elements not only because of their potential capability for performing fast logic operations but also because of the possibility they afford for construction of massively parallel computer architectures. It is contemplated that a single array of optical logic elements might contain at least $10^6$ logic gates which would function simultaneously. Several such arrays might be optically interconnected by a series of lenses thus permitting operation of more logic elements in a given time period than is presently contemplate for electronic logic elements.

Several types of optical logic elements have been developed. For example, highly nonlinear semiconductor materials such as InSb, InAs or GaAs may be used in optical bistable devices. See, for example, *Applied Physics Letters*, 42, pp. 131-133, Jan. 15, 1983. Use of such semiconductors in multiple quantum well (MQW) devices relying on absorption effects caused by excitons has also been demonstrated. One promising MQW device is termed the self-electro-optic effect device (SEED) and uses optically influenced electric fields to modulate the light beam. See, for example, *Applied Physics Letters*, 45, pp. 13-15, 1984. These elements may be termed single beam logic elements.

Yet another approach to optical logic elements uses a nonlinear Fabry-Perot etalon to form logic gates. See, for example, *Applied Physics Letters*, 44, pp. 172-174, Jan. 15, 1984. This technique uses, for example, two input beams and a probe beam with a nonlinear medium selected so that the absorption of a single input pulse changes the refractive index enough to shift the Fabry-Perot transmission peak of the probe beam by approximately one full width at half maximum. Of course, the peak returns to its initial wavelength after the medium relaxes. However, the probe transmission after the input beams are incident on the etalon determines the output. Pulsed operation was also contemplated and even preferred. This type of logic element will be referred to as a dual beam device as the device distinguishes between two beams, in this case because they are at different wavelengths.

Similar work has described, for example, optical modulation by optical tuning of a Fabry-Perot cavity but the potential for performing logic operations was not explicitly described. The transmission of a single beam through the cavity was modulated by a control beam which varied the refractive index of the cavity medium thereby changing the refractive index for the signal beam. See, for example, *Applied Physics Letters*, 34, pp. 511-514, Apr. 15, 1979.

Although optical logic elements afford, at least theoretically, enormously enhanced switching capabilities as compared to electronic logic elements, it must be understood that they are also subject to the same fundmental physical limitations as are electronic logic elements. One such limitation is thermal in nature and caused by the necessity of removing the heat produced by absorption during logic element operation. The existence of this limitation was realized early in the development of optical logic elements. See, for example, *Applied Optics*, pp. 2549-2552, December 1969. Lack of adequate heat dissipation may alter the optical characteristics of the logic element, thereby either rendering it inoperative or degrading its operating characteristics. Additionally, an increased ability to dissipate the absorbed energy permits the packing density of the optical logic elements to be increased.

Accordingly, several approaches towards improving the thermal stability of optical logic elements have been taken. The most basic approach to thermal stability involves minimizing the absorbed power density. The InSb optical bistable devices reported show no apparent thermal instability. However, these devices had relatively large volumes and were thus not optimized for lowest power operation. The SEED device previously mentioned used optically induced electric fields, rather than an optical resonator, to modulate the beam and thus required relatively low optical power densities. However, its volume is also relatively large.

Another straightforward approach to thermal stability involves heatsinking. Of course, all devices are heat-sunk to some extent. However, both the materials used in the device and its method of operation may limit the effectiveness of heatsinking. For example, dielectric layers having low thermal conductivity may be used between the nonlinear medium and the heatsink thereby reducing the effectiveness of the heatsink.

Another approach involves minimizing the change in dielectric constant caused by variations in the heat sink temperature. This is effective as the output characteristics of the device depend upon the dielectric constant. This approach might be realized by operating the device at cryogenic temperatures where the slope of the bandgap energy versus the temperature curve is a minimum for many semiconductor materials. Another approach increases the dielectric tolerance, that is, the maximum allowable change in the dielectric constant which does not significantly alter the operating characteristics. This approach requires a large nonlinearity which is generally available at low temperatures.

Yet another approach to thermal stability uses pulsed operation. This involves lowering the duty cycle to reduce average power absorption. However, it also generally reduces data throughput. To make the duty cycle an absolute minimum without reducing the data throughput, the optical signals must be pulses having a length which is short compared to the medium relaxation time. Logic operation then requires the medium to be excited only for the duration of the pulses rather than for the entire clock period. The pulse duration is then infinitesimally small from the point of view of the medium. To operate in this mode with positive gain, the device must distinguish between two beams.

SUMMARY OF THE INVENTION

I have found that an optical logic element comprising an optical nonlinear element may have improved thermal stability when it further comprises a probe beam and at least one input beam incident on the element having characteristics selected so that variations in device operating temperature are minimized because temporal variations in energy absorption are minimized. In a preferred embodiment, the medium absorbs some energy from the probe beam in the absence of the input beam although it is primarily transmitted through the nonlinear element. The medium strongly absorbs the input beam, when present, thereby changing the refractive index of the medium and reducing absorption of the probe beam. The energies of the probe and input beams are selected so that there is essentially constant heat dissipation. Thermal stability is obtained because it is more thermally stable to absorb a constant amount of energy for all input data than it is to absorb smaller, but varying, amounts for some of the data. This is true because of the realization that thermal stability only requires that the operating temperature be constant. This technique for obtaining thermal stability will be referred to as data energy matching. In another preferred embodiment, the optical logic element is a dual beam device using a transmission Fabry-Perot etalon. In yet another embodiment, arrays of optical logic elements are cascaded and interconnected optically by lenses. The roles of probe and input beams are interchanged between arrays, i.e., the probe beam from one array becomes the input beam for the following array.

For reasons of clarity, the components depicted are not drawn to scale.

DETAILED DESCRIPTION

The invention will be particularly described by reference to a particular embodiment. Other embodiments and variations will be readily thought of by those skilled in the art.

Figure 1:
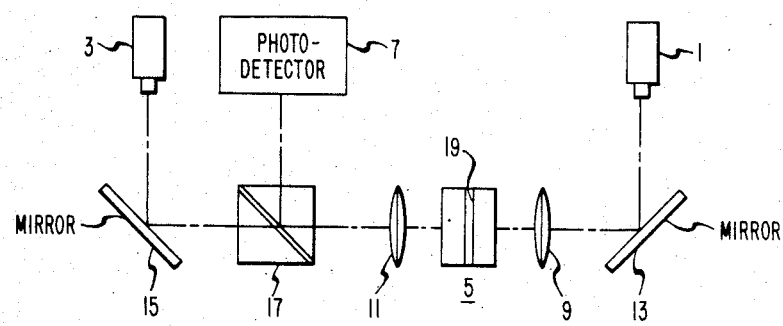
FIG. 1 is a schematic representation of an optical logic element according to this invention.

FIG. 1 is a schematic representation of an exemplary embodiment of an optical logic element according to this invention. Depicted are probe beam source 1, at least one input beam source 3, a nonlinear element 5, and means for detecting the output 7 from the nonlinear element. Means 7 may be a photodetector. Also depicted are lenses 9 and 11 which focus the probe and input beams, respectively, onto the nonlinear element. The probe and input beams are directed to the nonlinear element by mirrors 13 and 15, respectively. The probe beam is directed to the means for detecting by beam splitter 17. Sources 1 and 3 include means for varying the intensities of the beams. The nonlinear element includes a nonlinear medium indicated as 19.

The input and probe beams desirably have different wavelengths, i.e., the logic element is a dual beam device. It is generally desirable, because of typical semiconductor absorption characteristics, to have a probe beam wavelength which is longer than the input beam wavelength. This facilitates some logic operations, such as NOR, as probe beam absorption is minimized. It is also desirable, when operating in a pulsed mode, to have the probe beam follow the input beam as this enables all the energy from the input beam to be absorbed.

In the particular embodiment depicted, the nonlinear element is a transmission nonlinear Fabry-Perot etalon using a multiple quantum well (MQW) structure grown by, for example, molecular beam epitaxy as the nonlinear medium. The MQW structure nominally contained 63 periods of 76 Angstrom thick GaAs and 81 Angstrom thick $Al_{0.37}Ga_{0.63}As$ layers which were clad by $Al_{0.37}Ga_{0.63}As$ layers for a total thickness of approximately 1.25 $\mu$m. The etalon mirrors were ten layer dielectric interference filters with a four-wave thick spacer. The filters were designed for high transmission at a peak output wavelength of a mode locked laser emitting at 825 nm and had 97 percent or greater reflectivity for wavelengths greater than 850 nm. This type of mirror is desirable because it permits high finesse at the probe wavelength and also makes efficient use of input pulses at wavelengths close to the probe wavelengths.

The probe was an 875 nm 10 mW beam from a CW dye laser, and 7 ps input pulses were the output of a synchronously pumped mode locked dye laser having peak output at 825 nm and equipped with a cavity dumper. The probe may be operated in a pulsed mode. The CW mode of operation was selected to more clearly show the relaxation characteristics. It was also possible to adjust the energy of the input pulses. The gate can use a relatively high energy probe pulse which is controlled with a weak input pulse, i.e., its transmission characteristics through the Fabry-Perot cavity are determined by the input pulse. The logic element is thermally stable regardless of the input data due to adjustment of the relative beam intensities which permits the data energy matching.

This is better understood from the following considerations. The nonlinear element is highly absorbent at the input beam wavelength, but approximately transparent, absent an input beam, to the probe beam although some of the probe energy is absorbed. The nonlinear medium within the nonlinear element can be transparent and the element not due to tuning of the cavity. The changes in the probe absorption are nominally due only to changes in the etalon tuning and not to any change in absorptivity at the probe wavelength. If there is no input beam, transmission and absorption of the probe beam are both maximized. However, if one or more input beams are present, the probe beam is primarily reflected. This is because absorption of the input beam by the nonlinear medium changes its refractive index at the probe wavelength, and thus, the optical length of the cavity seen by the probe varies. Because the probe beam has a much higher energy than does the input beam, the small fractional absorption of the probe beam in the nonlinear medium or in the mirrors may result in as much energy absorption as occurs with one input beam. Then for zero and one input levels, the absorbed energies are approximately equal and temperature stability is obtained although the operating temperature may be above the ambient temperature.

Variations will be readily thought of. For example, the nonlinear medium might be a bulk semiconductor material rather than an MQW structure. The latter type of structure appears preferred at the present time because of the strong nonlinear effects caused at room temperature by excitons. A reflecting Fabry-Perot etalon, i.e., one with a totally reflecting back mirror, might also be used. Exemplary semiconductor materials include GaAs, InP, and CdS.

It is also contemplated that there may be more than one input beam. In this case, the amount absorbed from the single input is only half of that absorbed for two inputs unless there is significant saturation of input absorption. It should be noted that the maximum energy that can be absorbed from the probe by the nonlinear medium is approximately equal to the energy absorbed from one input. After absorbing this much energy, the transmission peak of the Fabry-Perot cavity is detuned from the probe wavelength by about one instrument width, and absorption is very low. It should be noted that this analysis is an approximation which relies on the assumption that the pulses are long compared to the cavity buildup time. The analysis is invalid if probe absorption does not cause the same physical effect as absorption of the input. It is, however, generally a valid approximation. This energy self-limiting, which might be referred to as gain-limiting, of the probe pulse is analogous to the power-limiting exhibited by optical bistable devices.

The logic elements are most expediently operated as negative logic gates, for example, NOR or NAND, as these gates minimize the differences in energy absorption. The NOR gate appears preferred.

In the self-limited NOR gate, any pulse-to-pulse noise from the probe source is reduced by a factor which is approximately equal to the contrast. Thus, the self-limited gate is much more noise tolerant than is a nonself-limited gate. It should also be noted that the input and probe beams do not have to enter the nonlinear element from opposite sides of the cavity. They may enter from the same side.

following array. Selection of the nonlinear medium is somewhat more critical as the probe beam for the, for example, second array may be more highly absorbed than was the probe beam for the first array. Exemplary materials include GaAs and InP, as well as their related compounds, and CdS. The latter material is presently useful only at liquid helium temperatures.

The absorbed energy for different input data may be analyzed by considering probe pulses of energy $E_p$ which enter a NOR gate whose inputs are the outputs of similar gates. With an effective maximum transmission, T, fanout, f (the number of devices to which an output pulse is directed), and a normalized input absorption, $A_i$, the energy absorbed from an input pulse is $E_P T A_i/f$. For a fanout of two, the energy absorbed in levels zero, one, and two is given in Table 1 for both the general and self-limited cases. The contrast $\eta_{1,2}$ may be different for the one and two inputs. ($\eta$ denotes the ratio of output energies at high and low outputs; a single subscript designates the presence of one or two inputs; and a subscript pair is used where, due to dependence on data, association with a specific input level is not appropriate) The saturation parameter, X, accounts for possible

TABLE 1

| Level | Absorbed Energy For Possible Logic Levels | |
|---|---|---|
| | Energy (General) | Energy (Self-Limited) |
| 0 | $E_P\left[\dfrac{TA_i}{\eta_{1,2}} + A_P\right]$ | $E_P\dfrac{TA_i}{2}\left[1 + \dfrac{2}{\eta_{1,2}}\right]$ |
| 1 | $E_P\left[\dfrac{TA_i}{2}\left[1 + \dfrac{1}{\eta_{1,2}}\right] + \dfrac{A_P}{\eta_1}\right]$ | $E_P\dfrac{TA_i}{2}\left[1 + \dfrac{1}{\eta_{1,2}} + \dfrac{1}{\eta_1}\right]$ |
| 2 | $E_P\left[TA_i\dfrac{(1+X)}{2} + \dfrac{A_P}{\eta_2}\right]$ | $E_P\dfrac{TA_i}{2}\left[1 + y + \dfrac{1}{\eta_2}\right]$ |

Both the input and the probe beams may be operated either pulsed or CW. However, both beams should have the same temporal characteristics. The term "CW" means that the intensity is constant, or essentially constant, for a time longer than the device response time or for a clock period. "Pulsed" means for a time shorter than the medium relaxation time which must be less than the device clock period.

Figure 2:
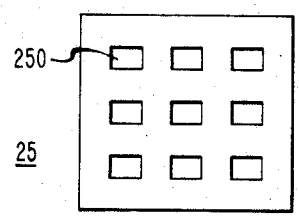
FIG. 2 is a schematic representation of an array of optical logic elements according to this invention.

FIG. 2 is a schematic representation of an array of optical logic elements according to this invention. As depicted, the array indicated as 25, comprises a plurality of optical logic elements, each of which is indicated as 250. The optical logic elements are not depicted in detail as they have already been represented in detail in FIG. 1. As depicted, the elements form a planar array.

Figure 3:
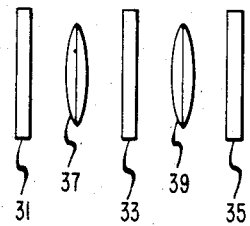
FIG. 3 is a schematic representation of cascaded arrays of optical logic elements according to the invention.

It is also contemplated that arrays of optical logic elements according to this invention may be cascaded, that is, they may be optically interconnected by lenses. One such cascaded array is depicted in FIG. 3 and comprises a plurality of arrays 31, 33 and 35 such as depicted in FIG. 2, optically interconnected by a plurality of lenses 37 and 39. The beams may propagate through the arrays in either direction. The nonlinear element in the second array will function as the means for detecting the output from the first array, etc. Selection and use of lenses having the necessary characteristics will be readily done by those skilled in the art.

In one embodiment, the roles of the probe and input beams are interchanged in successive arrays. That is, the probe beam in one array becomes the input beam of the saturation of the input absorption, and it is defined as the ratio of the energy absorbed from a second input to that of a single input. For no saturation, $X = 1$. It should be noted that the approximation has been used that $\eta_2$ is approximately equal to $(1+X)(\eta_1)$. The self-limited case is of interest because it reduces noise, provides matching between the zero and one input levels, and inevitably appears if one tries to increase gain without limit. However, both cases have difficulty in matching energies for one and two inputs.

A key problem in energy matching the NOR gate is the problem involved in minimizing X, that is, the problem involved in maximizing saturation of the absorption feature which is responsible for the nonlinearity. However, a reduced temperature variation by a factor of more than two is relatively easy to obtain and results in substantial noise reduction also.

Energy matching with respect to data is not as effective in the single beam devices as it is in plural beam devices. This is true because efficient energy matching requires that contrast be low and the output of the preceding gate be relatively low in efficiency. These requirements are satisfied in a single beam device only by having low gain. This is generally undesirable.

What is claimed is:
1. An optical device comprising:
    an optical nonlinear element;

means for making a probe beam incident on said element;

means for making at least one input beam incident on said element; and means for detecting the output from said element;

said element being such that, in the presence of said at least one input beam, a lesser amount of the energy of said probe beam is absorbed by said element as compared with energy of probe beam absorbed in the absence of said at least one input beam, whereby heat dissipated by said element is at least approximately constant during device operation.

2. An optical device as recited in claim 1 in which said probe and input beams have different wavelengths.

3. An optical device as recited in claim 2 in which said element is essentially transparent to said probe beam in the absence of said at least one input beam and absorbs said at least one input beam.

4. An optical device as recited in claim 3 in which said nonlinear element comprises a nonlinear Fabry-Perot etalon.

5. An optical device as recited in claim 4 in which said etalon is a transmission etalon.

6. An array of optical device comprising a plurality of optical logic elements as recited in claim 3, said plurality forming a first array.

7. An array of optical device as recited in claim 5 further comprising a second array; and a lens, said lens optically interconnecting said two arrays.

8. An array of optical device as recited in claim 6 in which said probe beam for said first array is said input beam for said second array.

9. An optical device as recited in claim 1 in which said nonlinear element comprises a material selected from the group consisting of GaAs, InP, and CdS.

10. An optical device as recited in claim 9 in which said nonlinear element comprises a multi-quantum well structure.

* * * * *